(12) United States Patent
Bergami

(10) Patent No.: US 11,845,034 B2
(45) Date of Patent: Dec. 19, 2023

(54) VEHICLE PROVIDED, AT THE INTAKE, WITH AN HEATABLE AIR FILTER PROVIDED AND CORRESPONDING HEATABLE AIR FILTER

(71) Applicant: BMC S.R.L., Medicina (IT)

(72) Inventor: Gaetano Bergami, Medicina (IT)

(73) Assignee: BMC S.R.L., Medicina (IT)

( * ) Notice: Subject to any disclaimer, the term of this patent is extended or adjusted under 35 U.S.C. 154(b) by 308 days.

(21) Appl. No.: 17/287,897

(22) PCT Filed: Oct. 23, 2019

(86) PCT No.: PCT/IB2019/059075
§ 371 (c)(1),
(2) Date: Apr. 22, 2021

(87) PCT Pub. No.: WO2020/084527
PCT Pub. Date: Apr. 30, 2020

(65) Prior Publication Data
US 2021/0394110 A1   Dec. 23, 2021

(30) Foreign Application Priority Data
Oct. 23, 2018   (IT) .................... 102018000009700

(51) Int. Cl.
*F02C 7/052*   (2006.01)
*B01D 46/42*   (2006.01)
(Continued)

(52) U.S. Cl.
CPC ....... *B01D 46/4263* (2013.01); *B01D 46/521* (2013.01); *B64D 33/02* (2013.01); *B64D 2033/0233* (2013.01)

(58) Field of Classification Search
CPC .. B01D 46/4263; B01D 46/521; B64D 33/02; B64D 2033/0233; F02C 7/05; F02C 7/052; F02C 7/055; F02C 7/047
See application file for complete search history.

(56) References Cited

U.S. PATENT DOCUMENTS

| 4,707,167 A | 11/1987 | Saito et al. |
| 2002/0170435 A1 | 11/2002 | Joannou |
| 2011/0048238 A1 | 3/2011 | Gatchell et al. |

FOREIGN PATENT DOCUMENTS

| DE | 102007047403 | 4/2009 | |
| DE | 102016004904 A1 * | 10/2017 | ............. B60H 30/06 |

(Continued)

OTHER PUBLICATIONS

International Search Report and Written Opinion of the International Searching Authority dated Dec. 12, 2019, in connection with International Application No. PCT/IB2019/059075 (13 pages).

*Primary Examiner* — Steven M Sutherland
(74) *Attorney, Agent, or Firm* — MCCRACKEN & GILLEN LLC

(57) ABSTRACT

A vehicle provided with an engine, at least one air intake through which the engine takes in the external air needed to operate, and an air filter arranged downstream of the air intake. The air filter presents: at least one filtering material panel having a corrugated shape having a plurality of crests disposed towards an outer environment and a plurality of valleys arranged towards an internal environment; an outer reinforcement mesh; an inner reinforcement mesh; and a heating device which is designed to heat the filtering material panel. The heating device presents: a plurality of electrical conductors, which are completely independent and separated from the outer reinforcement mesh, rest on the outer surface of the filtering material panel, and are arranged only and exclusively at the crests; and a supply device (Continued)

designed to cause an electric current to flow through the electric conductors so as to generate heat, due to the Joule effect.

22 Claims, 11 Drawing Sheets

(51) Int. Cl.
*B01D 46/52* (2006.01)
*B64D 33/02* (2006.01)

(56) References Cited

FOREIGN PATENT DOCUMENTS

| EP | 657631 | A1 | * | 6/1995 | ......... B01D 39/2082 |
|----|--------|----|---|--------|------------------------|
| EP | 764455 | A2 | * | 3/1997 | ......... B01D 39/2044 |
| WO | WO2017115331 | | | 7/2017 | |
| WO | WO2018073804 | | | 4/2018 | |
| WO | WO2018073806 | | | 4/2018 | |

* cited by examiner

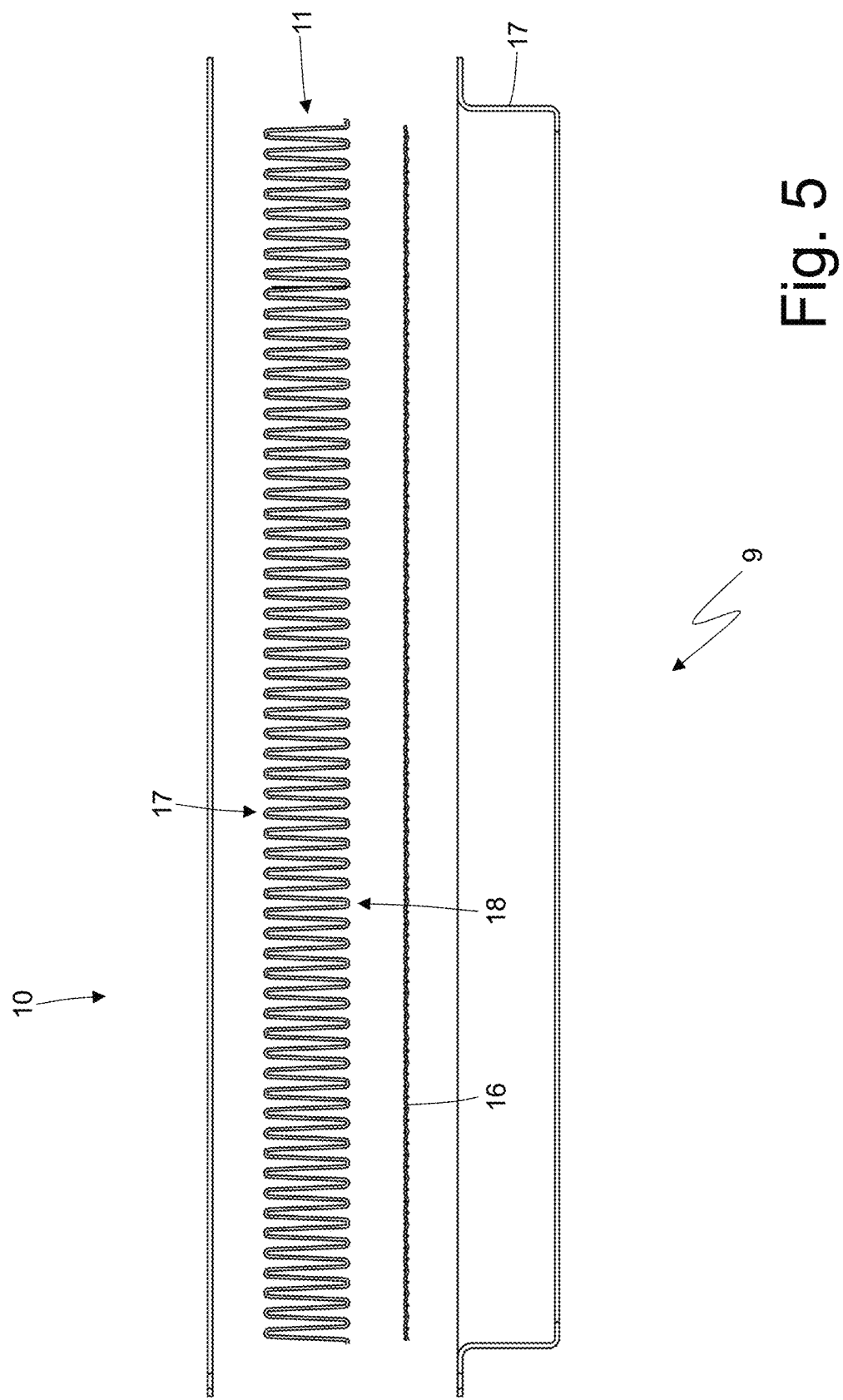

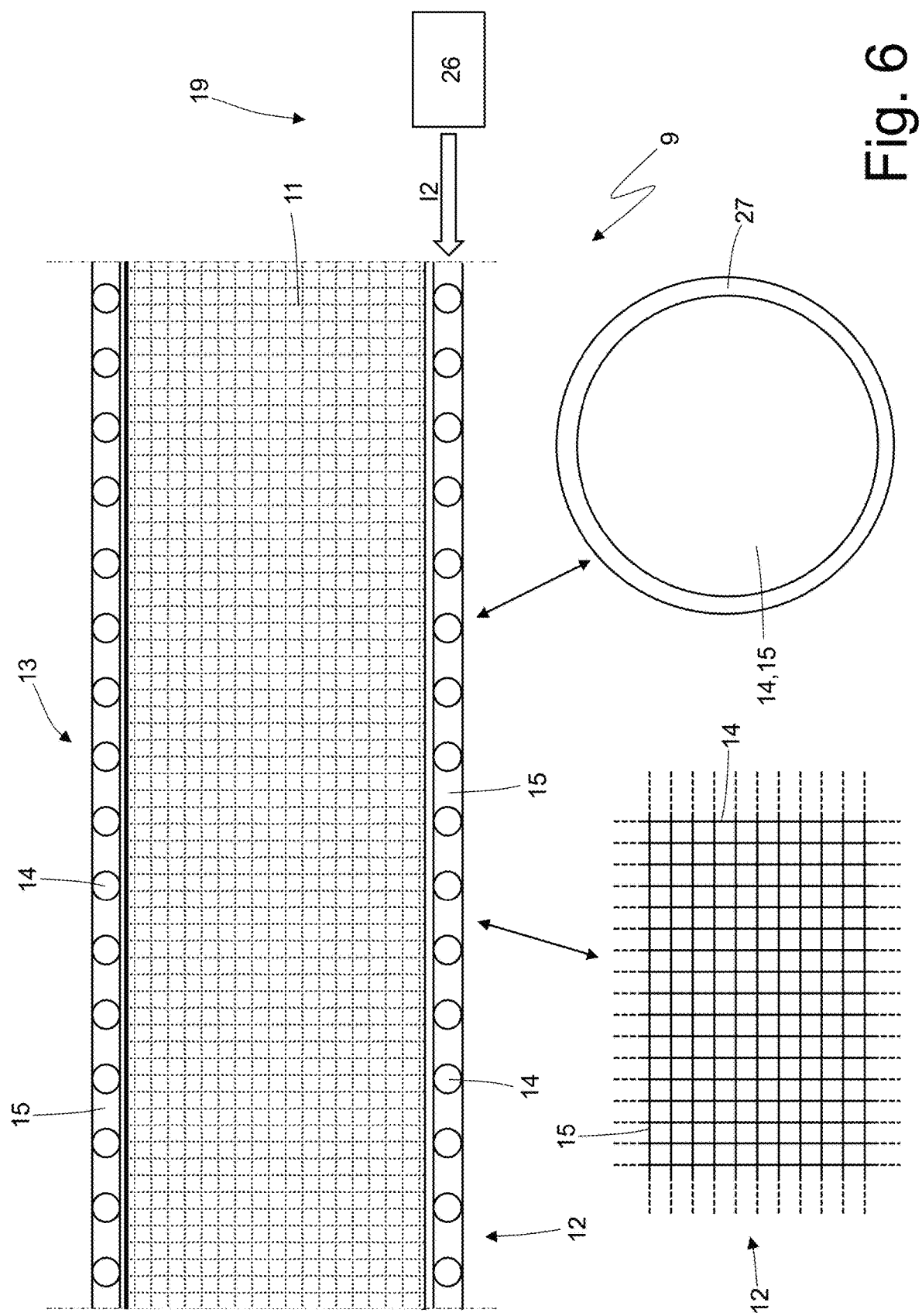

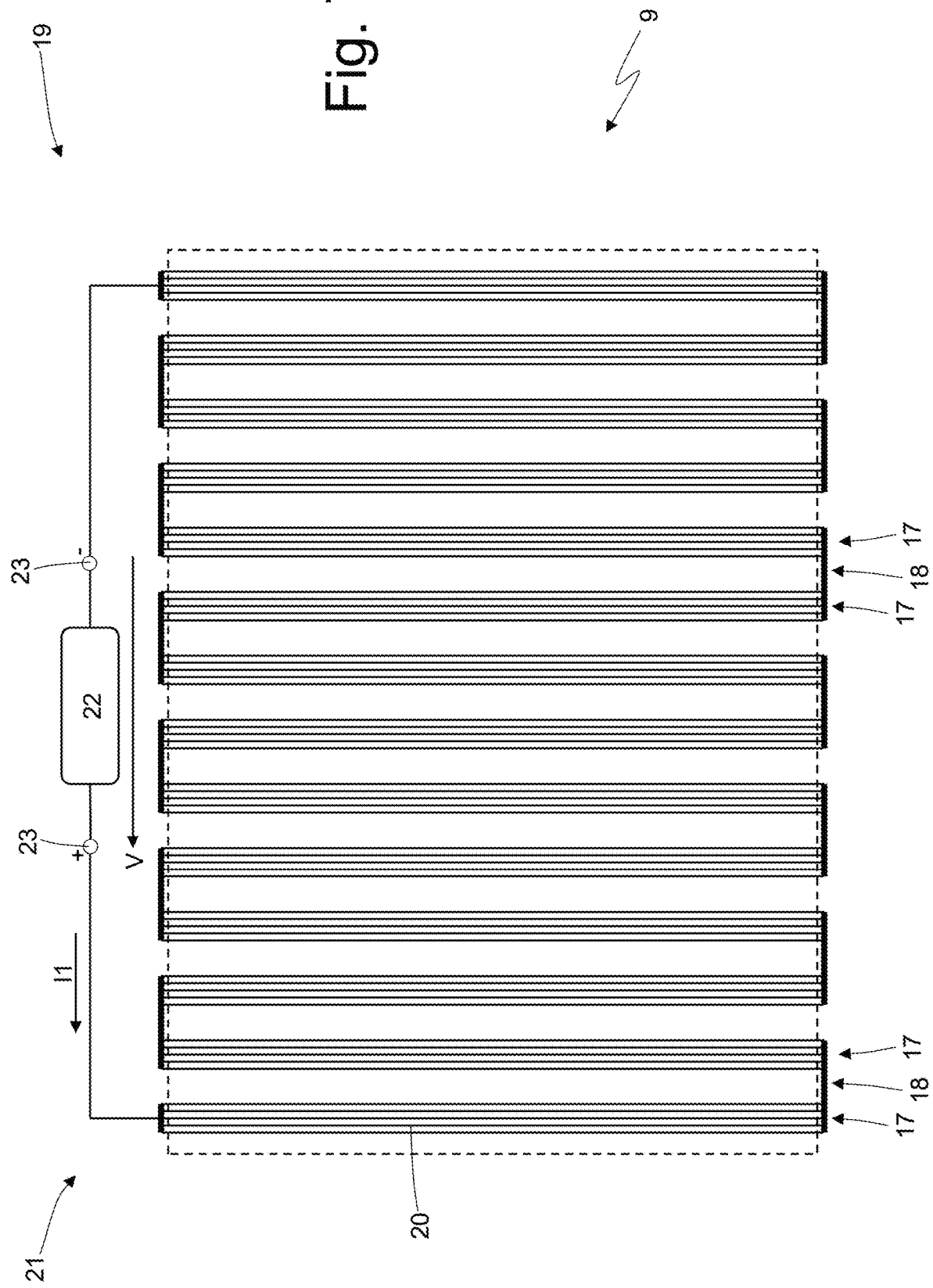

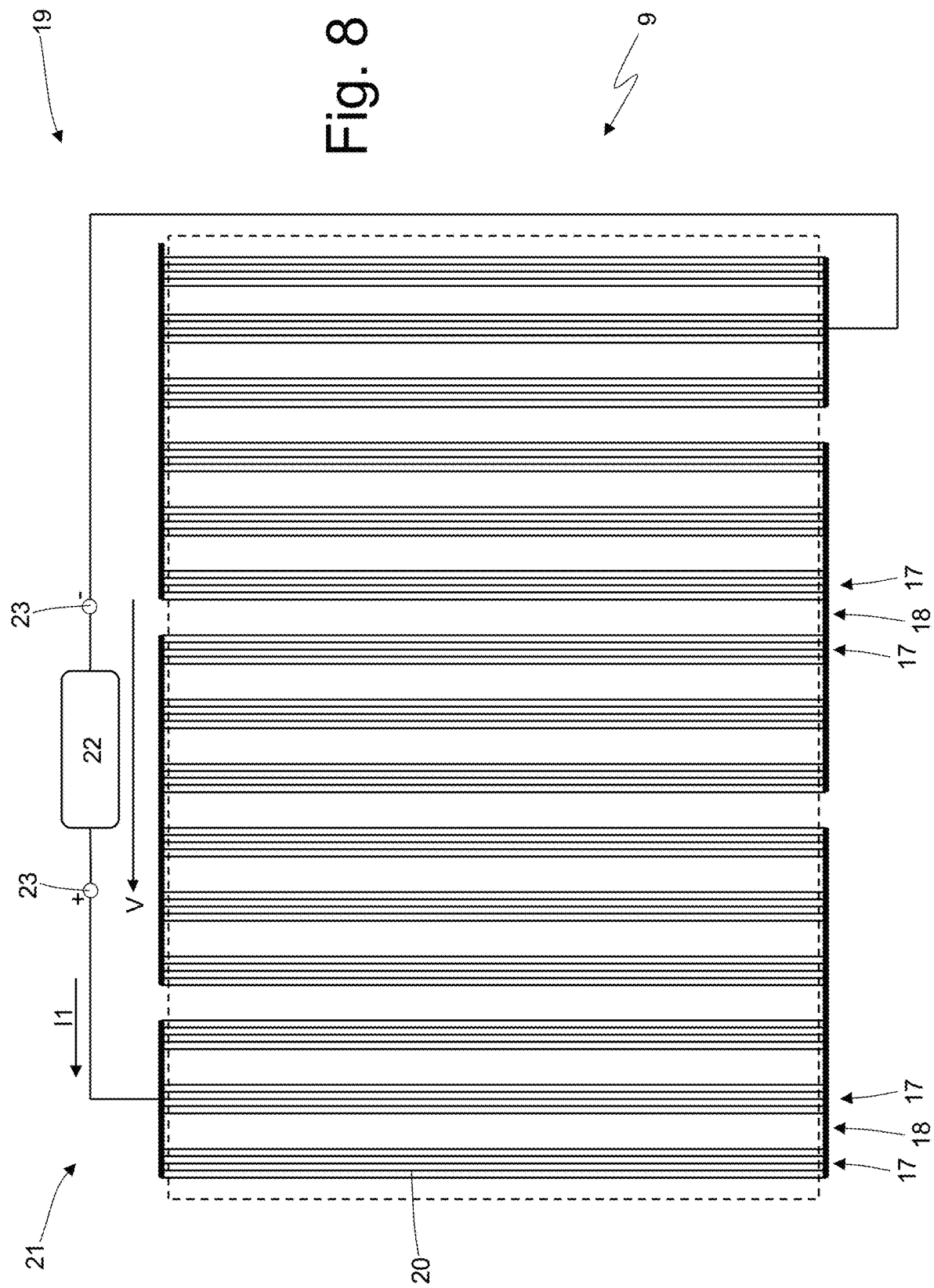

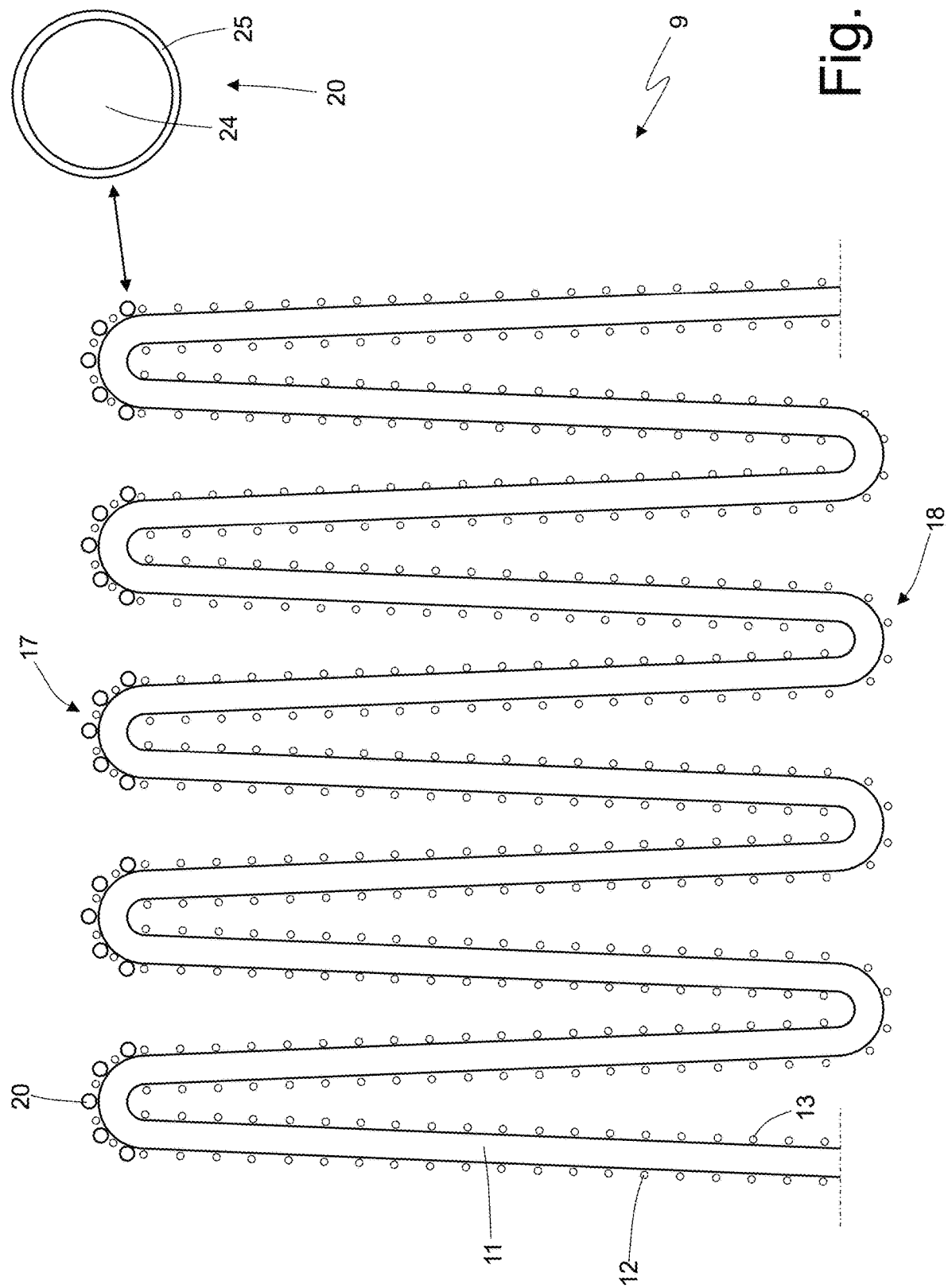

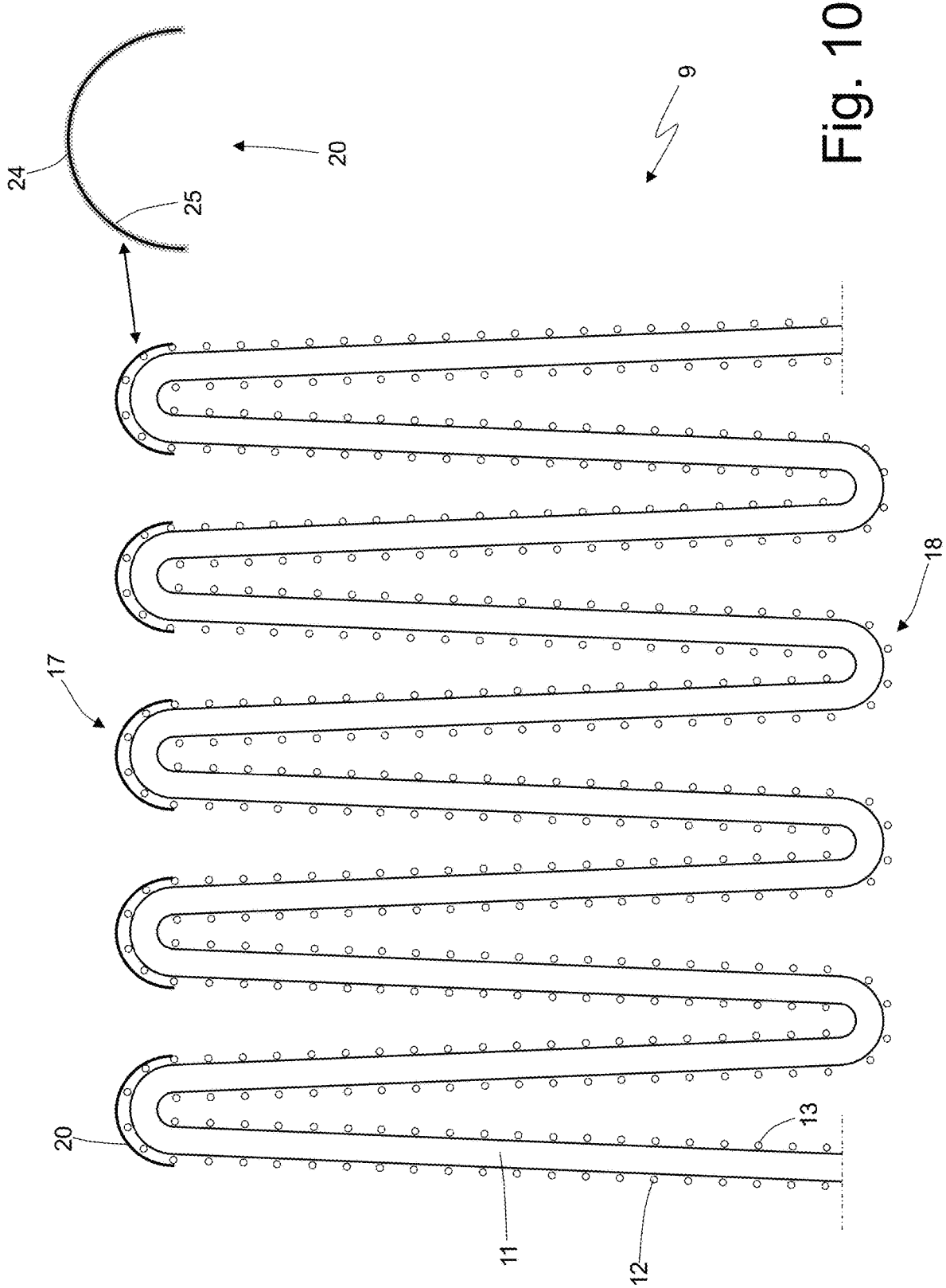

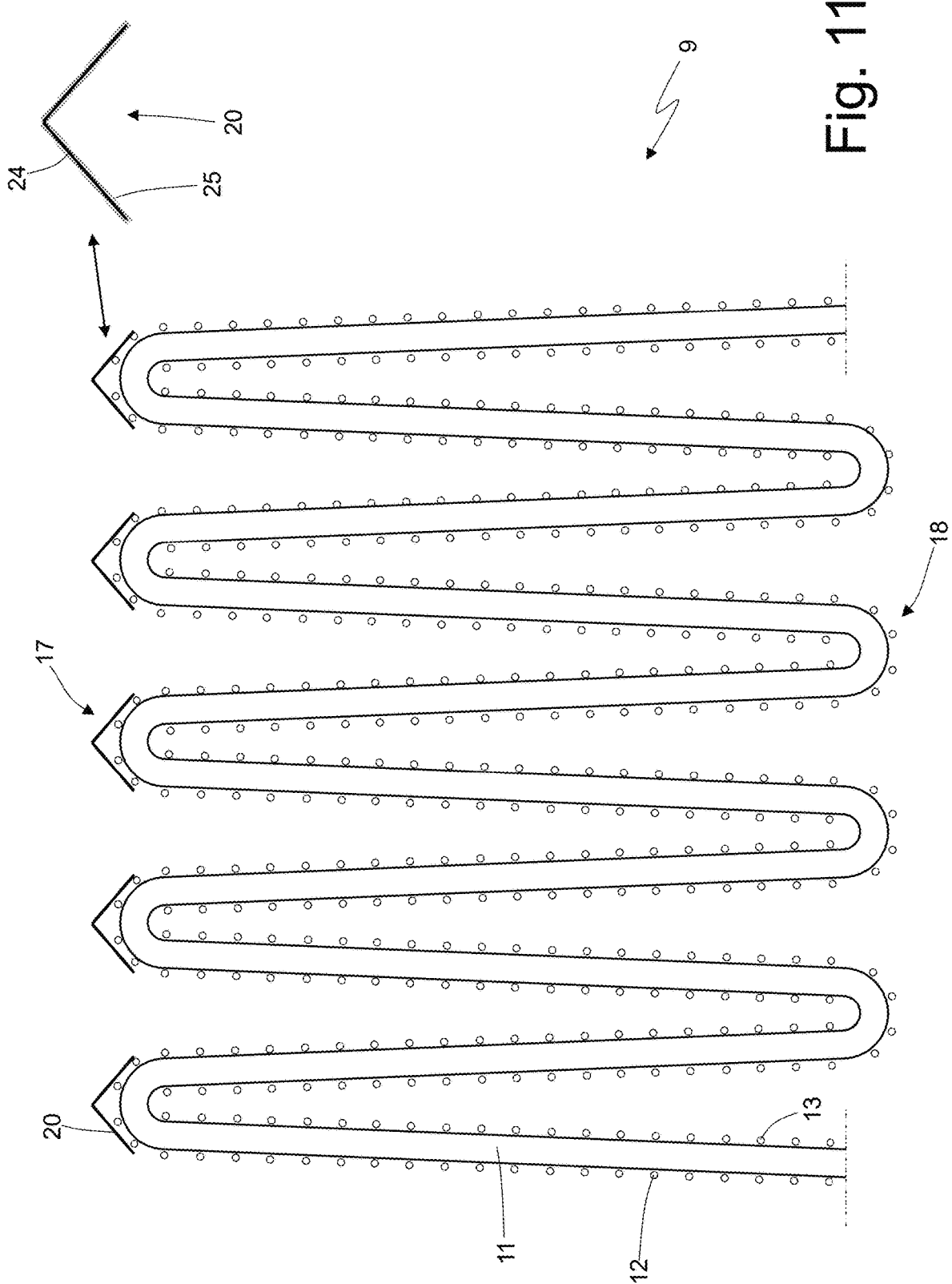

VEHICLE PROVIDED, AT THE INTAKE, WITH AN HEATABLE AIR FILTER PROVIDED AND CORRESPONDING HEATABLE AIR FILTER

CROSS-REFERENCE TO RELATED APPLICATIONS

This Patent application claims priority from Italian Patent Application No. 102018000009700 filed on 23 Oct. 2018, the disclosure of which is incorporated by reference.

FIELD OF THE INVENTION

The present invention relates to a vehicle provided, at the intake, with an heatable air filter and a corresponding heatable air filter.

The present invention can advantageously be applied to an aircraft (i.e., a man-made machine that is able to fly by gaining support from the air to transport persons or objects within the Earth's atmosphere) and in particular to a helicopter, to which the following disclosure explicitly refers without any loss of generality.

PRIOR ART

Modern helicopters are usually provided with at least one turbine engine that drives a rotor blade system which allows said helicopter to take off and land vertically, to hover and to fly laterally, backwards and forwards. The turbine engine has an air intake at the front, through which the turbine engine takes in the outer air needed for it to operate (i.e., the outer air containing the oxygen needed for combustion).

Generally speaking, the air intake may comprise a metal grid with a relatively large mesh size (in the region of one or two centimetres) the purpose of which is to prevent birds from getting in. Between the air intake and the turbine engine there may be an air filter with the function of filtering the air that is taken in, so as to hold back small impurities (dust and the like) which could, in the long term, lead to premature wear of the turbine engine.

The air filter can only be used when the ambient temperature is (adequately) above zero (on the ground and in the air), because the filtering material is usually hygroscopic and so tends to absorb moisture from the air: when the temperature falls to below zero the moisture in the filtering material freezes to form ice that creates a (more or less extensive) barrier through which the air is unable to enter (but the same problem would also arise with a non-hygroscopic filtering material owing to the surface moisture that forms on the outside surfaces of the filtering material or owing to the snow that could settle on the outside surface of the filtering material). As a consequence, when the ambient temperature is close to or below zero the air filter cannot be used (in particular it is bypassed by opening one or more bypass ducts arranged parallel to the air filter). Alternatively, it has been proposed to fit the air filter with an heating device that is designed to keep the temperature of the filtering material at a temperature (adequately) above zero.

Patent applications WO2017115331A1 and WO2018073804A1 describe a vehicle provided, at the intake, with an air filter provided with an heating device, which is electrically connected to a group of electrified wires of an outer reinforcement mesh and is designed to cause an electric current to flow through said electrified wires, so as to generate heat, due to the Joule effect, on the inside of said outer reinforcement mesh.

DESCRIPTION OF THE INVENTION

The purpose of the present invention is to propose a vehicle provided, at the intake, with an heatable air filter and a corresponding heatable air filter, said vehicle and air filter are particularly effective and efficient in counteracting the formation of ice (particularly when crossing clouds containing undercooled water) and, at the same time, being easy and inexpensive to produce.

According to the present invention there is provided a vehicle equipped, at the intake, with an heatable air filter and an heatable air filter, as claimed in the appended claims.

The claims disclose embodiments of the present invention forming an integral part of the present disclosure.

BRIEF DESCRIPTION OF DRAWINGS

The present invention will now be described with reference to the accompanying drawings, which illustrate a non-limiting embodiment thereof, in which:

FIG. 2 is a schematic cross-sectional view of an air box provided with an air filter and through which the air needed to operate a turbine engine of the helicopter shown in FIG. 1 is taken in;

FIG. 5 is an exploded cross-sectional view along the line IV-IV of the air filter;

FIG. 6 is an enlarged scale view of a detail of FIGS. 4 and 5;

FIG. 7 is a schematic and plan view of part of a heating device coupled to the air filter;

FIG. 8 is a schematic and plan view of a variant of the heating device;

FIG. 9 is a schematic and cross-sectional view of part of a panel of filter material of the air filter; and FIGS. 10 and 11 are schematic and cross-sectional views of part of the panel of filter material of the air filter according to respective variations.

PREFERRED EMBODIMENTS OF THE INVENTION

Figure 1:
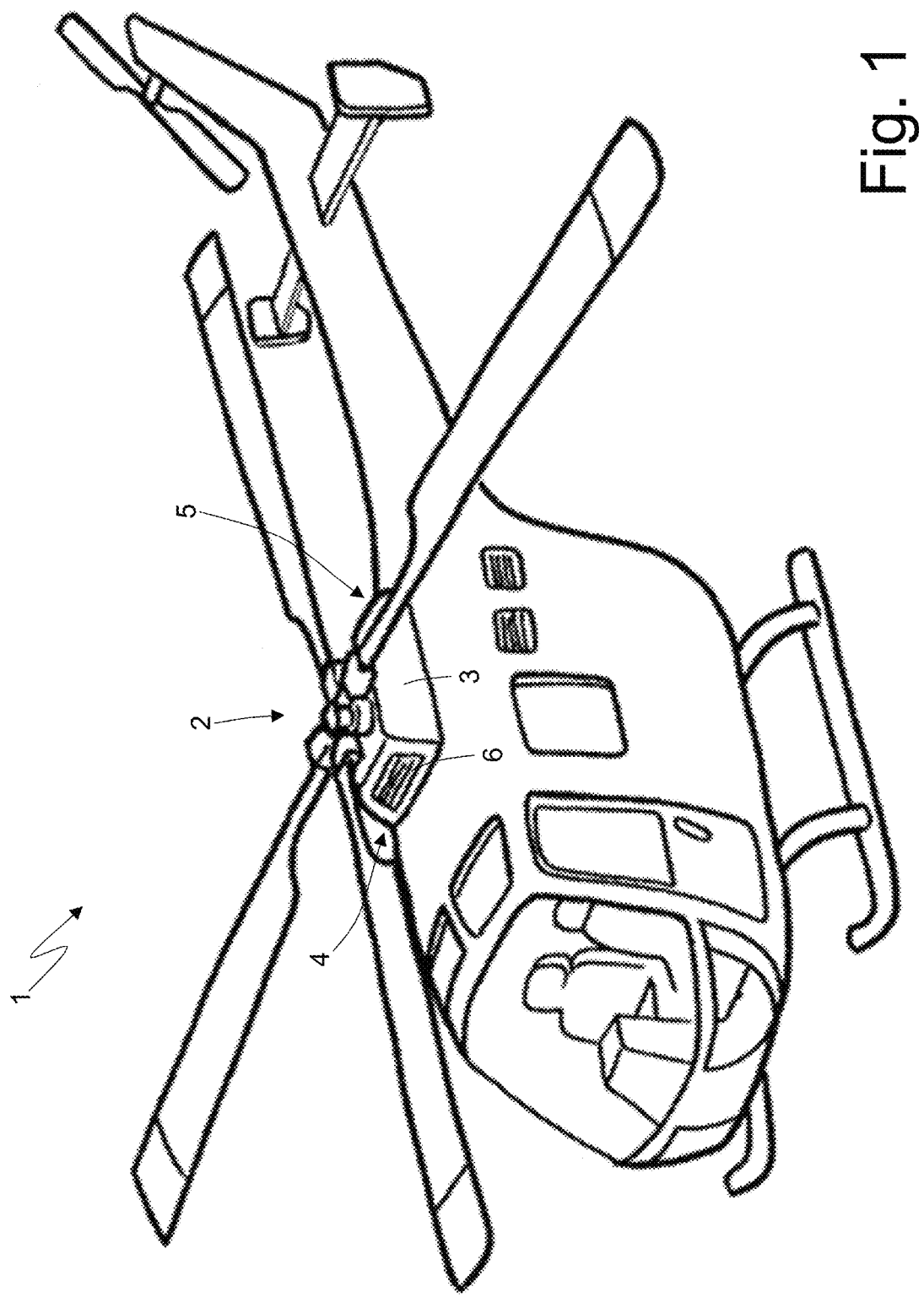
FIG. 1 is a perspective schematic view of a helicopter built according to the present invention.

In FIG. 1 denoted as a whole by reference numeral 1 is a helicopter comprising a turbine engine 2 that drives a rotor blade system which enables said helicopter to take off and land vertically, to hover and to fly laterally, backwards and forwards.

The turbine engine 2 comprises a tubular housing 3 having, at the front, an air intake 4 (through which the turbine engine 2 takes in the outer air needed for it to operate, i.e., the outer air containing the oxygen needed for combustion) and, at the back, an air outlet 5 (through which the turbine engine 2 expels the exhaust gas produced by the combustion process). In the area of the air intake 4 there is a metal grid 6 with a relatively large mesh size (in the region of one or two centimetres) the function of which is to prevent birds from getting in.

Figure 2:
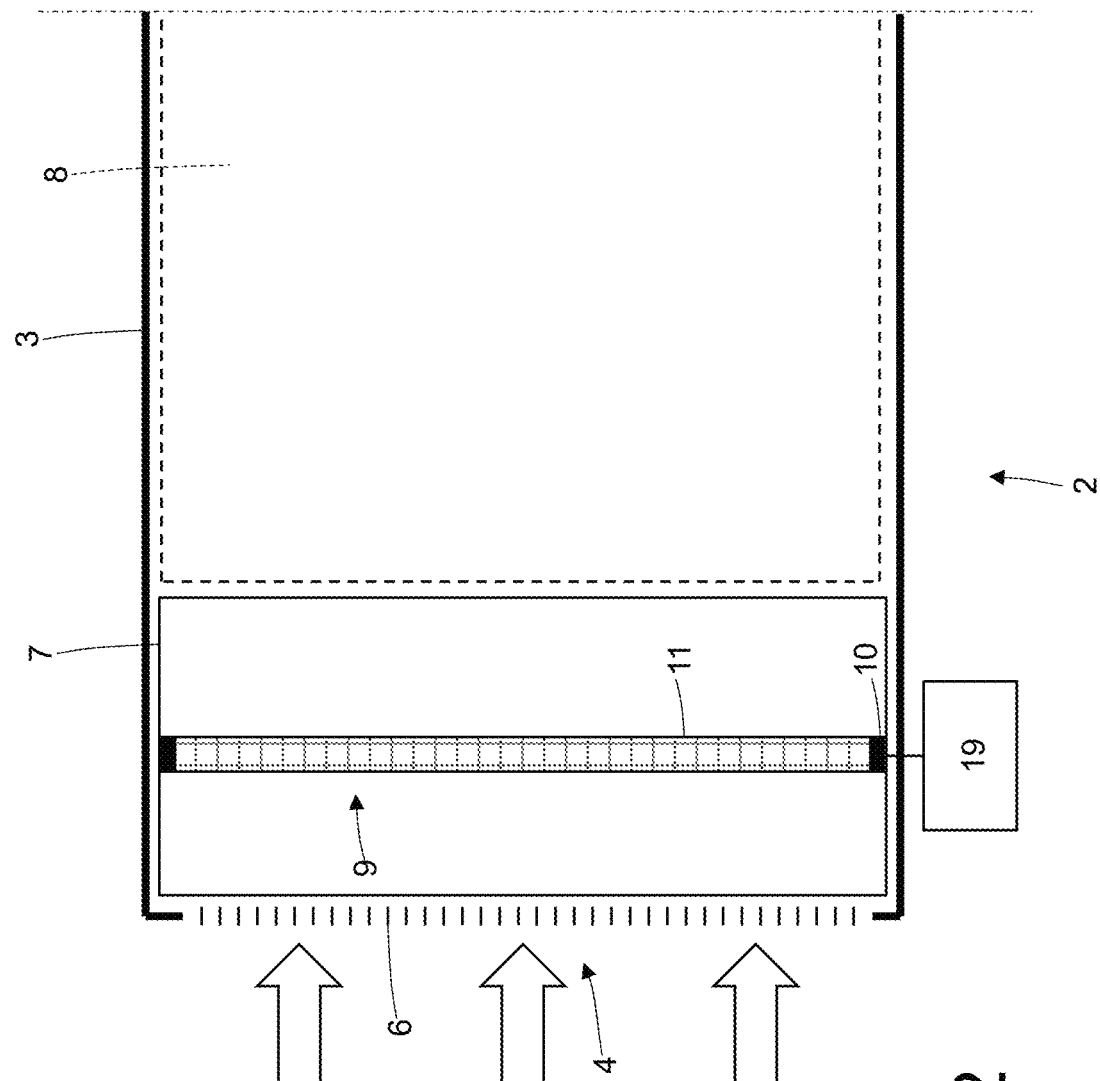
Figure 3:
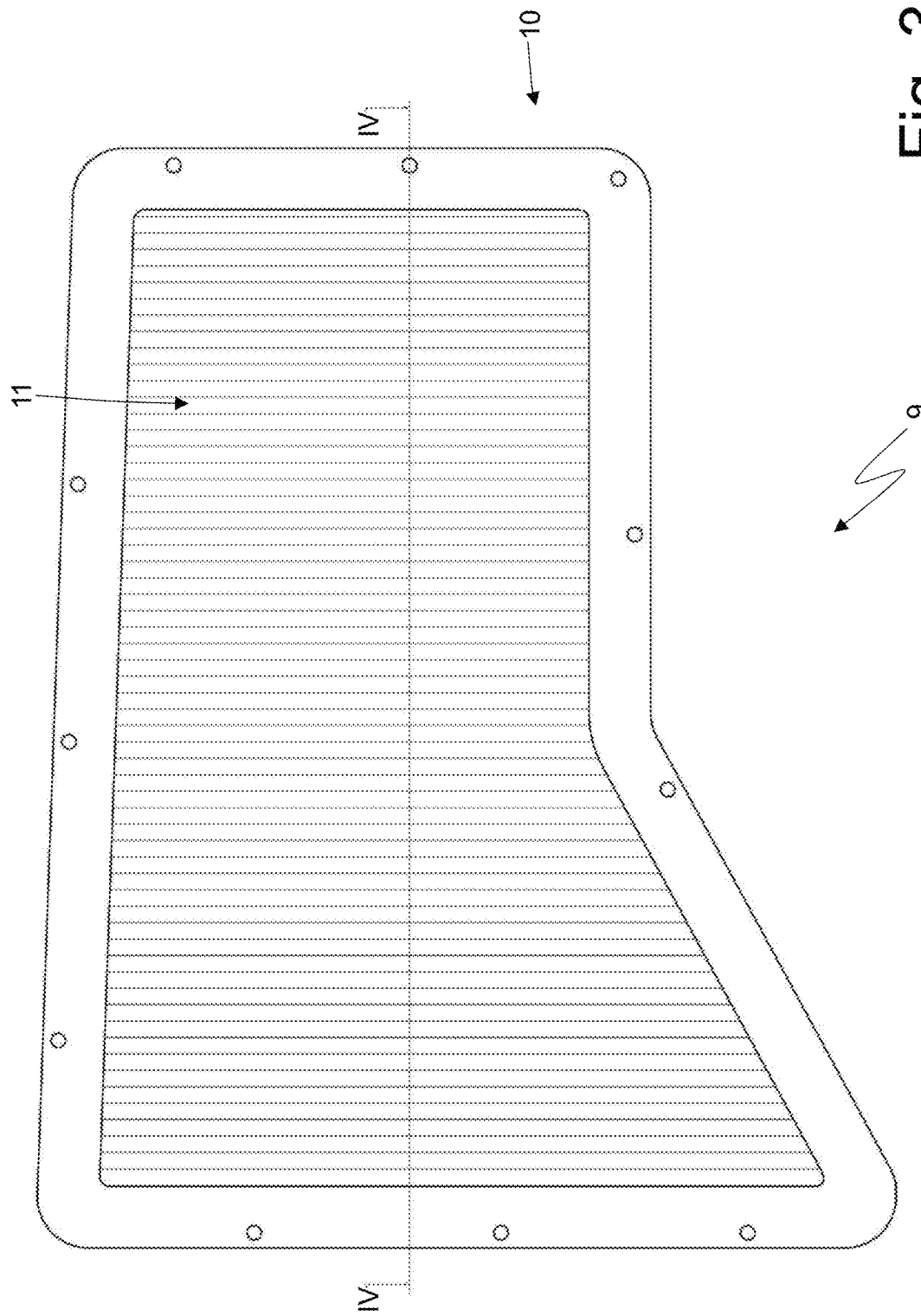
FIG. 3 is a plan view of the air filter.

As illustrated in FIG. 2, in the tubular housing 3 there is an air box 7 which has, on the inside, a cavity with an inlet opening coupled to the air intake 4 of the tubular housing 3 and an outlet opening coupled to an intake system 8 of the turbine engine 2 (fresh air is conveyed through the intake system 8 towards the moving parts of the turbine engine 2 in which fuel combustion takes place using the air taken in as the comburent air i.e., towards the combustion chamber of the turbine engine 2). Inside the cavity of the air box 7 there is an air filter 9 which is interposed between the inlet opening and the outlet opening and thus divides the cavity into an intake chamber, which is arranged upstream of the air filter 9 and communicates with the outer environment, and an outlet chamber, which is arranged downstream of the air filter 9 and communicates with the intake system of the turbine engine 2. The air filter 9 is arranged downstream of the air intake 4 and has the function of filtering the intake air in order to withhold small impurities (dust and the like) which could, in the long term, lead to premature wear of the turbine engine 2.

The air filter 9 comprises a peripheral frame 10 (made of aluminium, of plastic material or of a composite material) that supports a filtering material panel 11. It is important to observe that the shape of the air filter 9 as seen in a plan view may vary (for example round, rectangular, elliptical, triangular, trapezoidal or a combination of these) depending on the shape of the tubular housing 2, i.e., depending on the shape of the air box 7 in which the air filter 9 is housed.

According to that illustrated in FIGS. 3-6, the air filter 9 comprises the peripheral frame 10 which supports the filtering material panel 11 which is pleated (i.e. folded, folded over itself to form a succession of waves); in other words, the filtering material panel 11 is wave-shaped (i.e., with a wave-shaped configuration) to increase the useful surface of filtering material without increasing the outer dimensions).

According to what shown in FIG. 6, the air filter 9 comprises a thin pleated outer reinforcement mesh 12 and a thin pleated inner reinforcement mesh 13 which rest against opposite surfaces of the filtering material panel 11 (i.e., enclosing the filtering material panel 11 between them) to give said filtering material panel 11 a stable shape and strength. In other words, the filtering material panel 11 is covered on both sides by the reinforcement meshes 12 and 13 (i.e., it is contained between the reinforcement meshes 12 and 13) which give said filtering material panel 11 a stable shape. It is important to observe that the reinforcement meshes 12 and 13 are dimensioned both to give the panel 11 the required shape stability in order to withstand the air pressure without becoming deformed, even when the helicopter 1 travels at high speed with a strong headwind, and so that it does not constitute too big an obstacle to the air flow (i.e., so as not to produce an excessive loss of load in the intake air flowing through the air filter 9).

The outer reinforcement mesh 12 rests against an outer surface of the filtering material panel 11 through which the intake air enters to pass through said filtering material panel 11; the inner reinforcement mesh 13, instead, rests against an inner surface of the filtering material panel 11 which is opposite the outer surface. In other words, the outer reinforcement mesh 12 is arranged upstream of the filtering material panel 11 with respect to the intake air flow, whereas the inner reinforcement mesh 13 is arranged downstream of the filtering material panel 11 with respect to the intake air flow.

As shown in FIG. 6, both of the reinforcement meshes 12 and 13 are made up of a plurality of warp wires 14 (i.e., which make up the warp) and a plurality of weft wires 15 (i.e., which make up the weft); the warp wires 14 extend in a linear direction, whereas the weft wires 15 are fed through the shed of the warp wires 14 by "winding" them around said warp wires 14. In other words, the weft wires 15 are interlaced with the warp wires 14 in such a way that the reinforcement meshes 12 and 13 are obtained by means of a weaving process (i.e., by interlacing the warp wires 14 with the weft wires 15). It is important to observe that the reinforcement meshes 12 and 13 have no welding spots (i.e., the wires 14 and 15 are not welded to each other) and are held together through the interlacing of the warp wires 14 with the weft wires 15 (i.e., they are held together by weaving the warp wires 14 with the weft wires 15). According to a possible embodiment, once the reinforcement meshes 12 and 13 have been formed the reinforcement meshes 12 and 13 can be provided with a further coating made of enamel or paint which also has the function of joining the wires 14 and 15 to one another (i.e., the further coating made of enamel or paint is applied to the reinforcement meshes 12 and 13 after the weaving of said reinforcement meshes 12 and 13); in other words, the enamel or paint coating that covers the reinforcement meshes 12 and/or 13 establishes a mechanical coupling between the weft wires 14 and the warp wires 15 and thus contributes to holding the reinforcement mesh 12 and/or 13 together in the correct position. Clearly, the enamel or paint coating that covers the reinforcement mesh 12 and/or 13 also provides an additional protection for the wires 14 and 15. By way of example, the enamel or paint coating could be applied by dipping the reinforcement mesh 12 and/or 13 in an enamel or paint bath.

To manufacture the air filter 9, the reinforcement meshes 12 and 13 and the filtering material panel 11 are manufactured separately as flat pieces, then the reinforcement meshes 12 and 13 are placed on opposite surfaces of the filtering material panel 11 to form a unit (i.e., a "sandwich") which is also flat and is then bent in a wave shape to give said unit its final shape; lastly, said wave-shaped unit is coupled to the peripheral frame 10 (usually by means of glue and/or resin) which, in addition to giving the air filter 9 a stable shape, also has the function of holding together the unit formed by the reinforcement meshes 12 and 13 and the filtering material panel 11.

Figure 4:
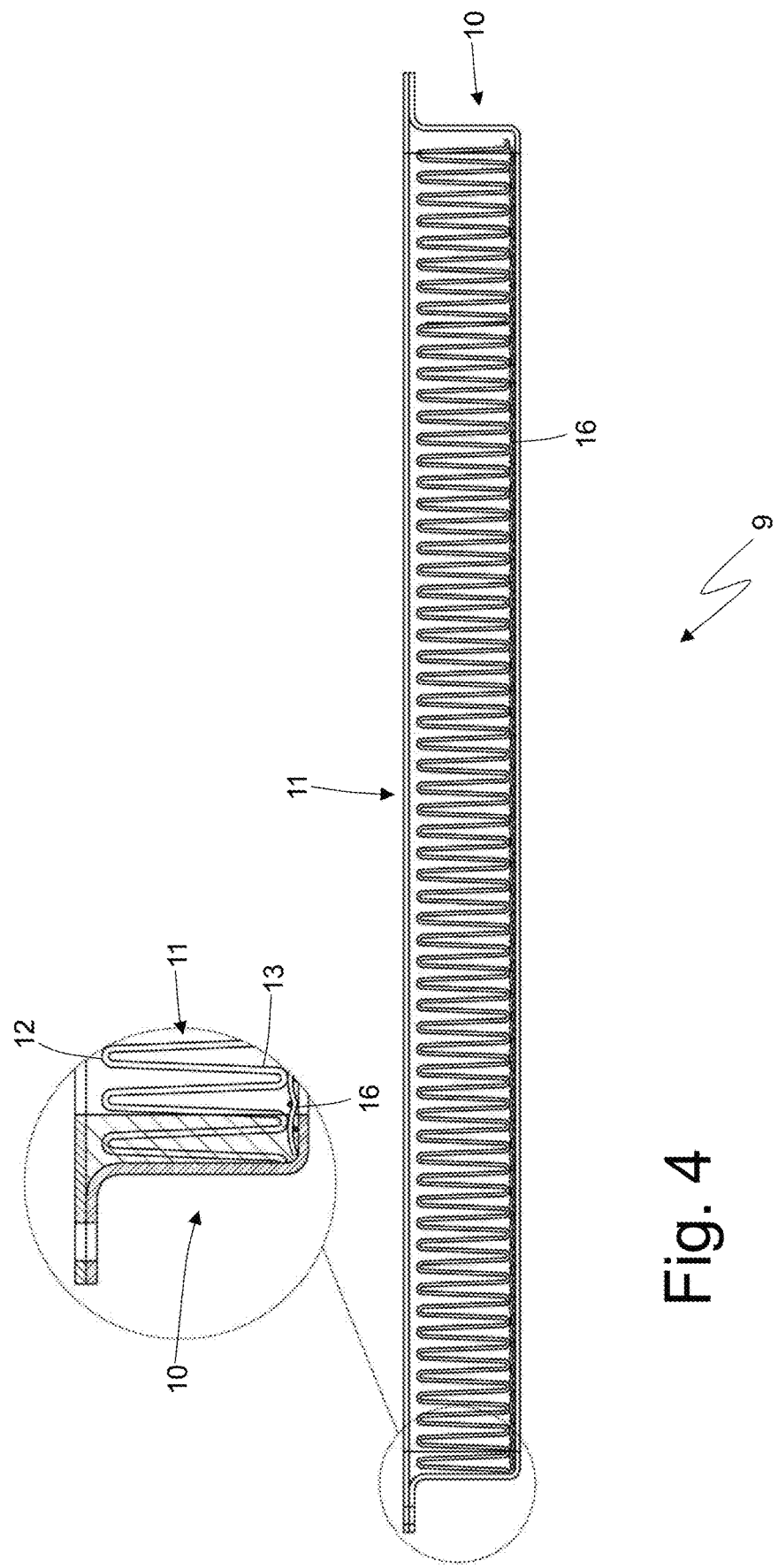
FIG. 4 is a cross-sectional view along the line IV-IV of the air filter.

According to a possible (but not mandatory) embodiment illustrated in FIGS. 4 and 5, the air filter 9 further comprises a plane (flat) stiffening mesh 16 which is arranged internally and has the function of helping the wave-shaped filtering material panel 11 to withstand the stress caused by the pressure generated by the intake air, without being deformed; the function of the reinforcement stiffening mesh 16 is more important in the case of air filters 9 with a large surface.

As shown in FIG. 9, the filtering panel 11 has a corrugated shape having a plurality of crests 17 arranged towards an outer environment (i.e. an environment in which unfiltered air is present, i.e. air which has not passed through the air filter 9, thus the inlet chamber of the air box 7) and a plurality of valleys 18 interspersed with the crests 17 and arranged towards an internal environment (i.e. an environment in which filtered air is present, i.e. air which has passed through the air filter 9, thus the outlet chamber of the air box 7). In other words, the crests 17 and the valleys 18 of the filter material panel 11 represent the outermost ends of the filtering panel 11: the crests 17 of the filtering material panel 11 are directed towards the outer environment (where it is present unfiltered air, i.e. air that has not passed through the air filter 9) while the valleys 18 of the filtering material panel 11 are directed towards the internal environment (in which filtered air is present, i.e. air that has passed through the air filter 9). Thus, the crests 17 of the filtering material panel 11 are arranged upstream with respect to the flow of the intake air and are first hit by the flow of the intake air, while the valleys 18 of the filtering material panel 11 are arranged downstream with respect to the flow of the intake air and are ultimately hit by the flow of the intake air.

The crests 17 and the valleys 18 of the filtering panel 11 are made up of rounded portions of the filtering material panel 11 (i.e. portions of the filtering material panel 11 shaped like a "U"). Each crest 17 of the filtering material panel 11 is connected to two corresponding valleys 18 of the filter material panel 11 from two respective flat sections of the filter material panel 11; similarly, each valley 18 of the filtering panel 11 is connected to two corresponding crests 17 of the filtering material panel 11 from two respective flat portions of the filtering panel 11.

As shown in FIG. 7, the air filter 9 comprises a heating device 19 which is adapted to heat (when necessary) the filtering material panel 11 (in particular at the outer surface of the filtering panel 11) to avoid the ice formation or to melt the ice that may be present.

The heating device 19 comprises a plurality of electrical conductors 20, which are completely independent and separate from the outer reinforcing mesh 12, and rest on the outer surface of the filtering panel 11 (i.e. the surface through which the intake air enters to pass through the of filter material panel 11) on the outer reinforcing mesh 12 (i.e. on the opposite side with respect to the filtering material panel 11), and are arranged (concentrated) only and solely at the crests 17. By way of example the electrical conductors 20 could be fixed to the outer surface of the filtering material panel 11 by interlocking in the weft of the outer reinforcing mesh 12 or by means of a tough adhesive (e.g. a two-component resin).

Furthermore, the heating device 19 comprises an electric circuit 21, which connects all the electric conductors 20. Finally, the heating device 19 comprises a supply device 22 which is adapted to apply a potential difference V to the ends 23 of the electric circuit 21 which causes the circulation of an electric current I1 (which distributes in all the electric conductors 20).

The heat generated by the electric conductors 20 is transmitted to the filtering material panel 11 either directly by thermal conduction (since the electric conductors 20 are resting on the outer surface of the filtering panel 11), and indirectly by the intake air which crossing the electrical conductors 20 heats up and then subsequently transfers heat to the filtering material panel when passes through the panel 11 of the filtering material. Furthermore, the heat generated by the electric conductors 20 dissolves any ice formed on the outer surface of the filtering panel 11 and prevents the formation of ice on the outer surface of the filtering panel 11.

Generally speaking, the power supply device 22 receives electric energy from an electric power bus of the helicopter and is able to control the value of the potential difference V applied at the ends 23 of the electric circuit 21 and thus to control the strength of the electric current I1 and thus the heat generated in the electric conductors 20 due to the Joule effect (it is important to observe that the potential difference V applied at the ends 23 of the electric circuit 21 may be reduced in intensity and/or in time). Normally, the electric power bus of the helicopter 1 supplies alternating electric voltage at 110 Volts. It is important to observe that the power supply device 22 could also be an ordinary switch (electronically controlled) that is closed to connect the ends 23 of the electric circuit 21 to the electric power bus of the helicopter 1.

The electrical circuit 21 connects the electric conductors 20 to each other in parallel and in series. In the embodiment illustrated in FIG. 7, the electric circuit connects in parallel all the electrical conductors 20 arranged on a same crest 17 of the filtering material panel 11 and then connects in series the parallel connections of the various crests 17. In the variant shown in FIG. 8, the electric circuit 21 connects in parallel the electrical conductors 20 arranged on more (three) side by side crests 17 of the filtering material panel 11 and then connects in series the parallel connections of the groups of crest 17. According to a further embodiment not shown, the electric circuit 21 connects all the electrical conductors 20 in parallel; this embodiment is excellent from the point of view of service continuity (since even if all the electric conductors 20 except one were cut through he only electrical conductor 20 still intact could continue to flow the electric current I1), but instead presents at the ends 23 of the electric circuit 21 a particularly low equivalent electrical resistance which could be incompatible with the electric voltage available on board the helicopter 1.

According to what is illustrated in FIG. 9, a plurality (five, but the number can generally be variable from a minimum of one to a maximum of a dozen) of electrical conductors 20 having a circular cross section are arranged in each crest 17 of the filtering material panel 11. Each electric conductor 20 comprises an inner core 24 made of an electrically conductive material (for example aluminum for its lightness or constantan) and an outer insulation 25 made of an electrically insulating material and, as far as possible, thermally conductive (typically an insulating enamel applied by a bath). Normally the electric conductors 20 are larger (thicker) than the wires 14 and 15 constituting the outer reinforcing mesh 12, i.e. each the electric conductor 20 has a cross section (substantially) larger than the wires 14 and 15 constituting the outer reinforcing mesh 12; for example, the area of the cross-section of each electric conductor 20 is at least three times greater than the area of the cross-section of the wires 14 and 15 constituting the outer reinforcing mesh 12.

According to the variants shown in FIGS. 10 and 11, in each crest 17 of the filtering material panel 11 a single flat conductor element 20 is arranged which, instead of having a circular cross-section as in the embodiment illustrated in FIG. 9, presents a "U" shaped cross section (as in the embodiment shown in FIG. 10) or a "V" shaped cross section (as in the embodiment illustrated in FIG. 11); in this embodiment, the concavity of each conductive element 20 is arranged towards the crest 17 to embrace the crest 17. The conformation of the conductive elements 20 of the embodiments shown in FIGS. 10 and 11 makes it more difficult to form ice on the crests 17 and above all the attachment of any ice to the crests 17 since the crests 17 are more "sharpened" (reducing geometrically the useful surface on which the ice can be attacked) and "slippery" (i.e. they tend to free themselves naturally from any ice).

Also in the embodiments shown in FIGS. 9 and 10, each electric conductor 20 comprises an inner core 24 of electrically conductive material and an outer insulation 25 made of an electrically insulating material (and, as far as possible, thermally conductive).

According to a preferred but non-binding embodiment illustrated schematically in FIG. 6, the heating device 19 also comprises a further supply device 26 which is adapted to circulate an electric current I2 through part of the outer reinforcing mesh 12 to generate heat by Joule effect inside the outer reinforcing mesh 12. The electric current I2 circulating through the outer reinforcing mesh 12 to generate the heat by Joule effect is generally different and independent of the electric current I1 which circulates through the electric conductors 20 to generate heat by the Joule effect. That is, the supply device 26 which circulates the electric current I2 through the outer reinforcing mesh 12 can be driven independently by the supply device 22 which circulates the electric current I1 through the electric conductors 20.

The heat generated by the outer reinforcing mesh 12 is transmitted to the filtering material panel 11 either directly by thermal conduction (since the outer reinforcing mesh 12 is supported by an outer surface of the filtering panel 11), and indirectly by means of the intake air \which, by passing through the outer reinforcing mesh 12, heats up and then subsequently releases heat to the filtering material panel 11 when it passes through the filtering material panel 11. Furthermore, the heat generated by the outer reinforcing mesh 12 dissolves any ice formed on the outer surface of the filter material panel 11 and prevents the formation of ice on the outer surface of the filter material panel 11.

According to a preferred embodiment shown in FIG. 6, each warp yarn 14 and each weft yarn 15 is provided with an outer insulation 27 made of an electrically insulating material and, as far as possible, thermally conductive.

According to a preferred embodiment, the heating device 19 causes the electric current I2 to circulate through a limited number of the wires 14 and 15 that make up the outer reinforcement mesh 12, i.e., only a limited number of the wires 14 and/or 15 that make up the outer reinforcement mesh are electrified (i.e., electrically connected to an electric voltage generator) in that the electric current I2 flows through them. The embodiments of the electrified outer reinforcing mesh 12 and the manner in which the heating device 19 circulates the electric current I2 through a limited part of the wires 14 and 15 of the outer reinforcing mesh 12 are known and described in the patent applications WO2017115331A1 and WO2018073804A1 incorporated herein by reference.

As previously said, preferably the heating device 19 is suitable both for heating the outer reinforcing mesh 12 by Joule effect by circulating the electric current I2, and to heat the electrical conductors 20 by Joule effect by circulating the electric current I1; in this embodiment, it is possible that under certain conditions (that is, when the outer conditions are not excessively rigid) only the electric current I2 is circulated (that is, only the outer reinforcing mesh 12 is heated) or only the electric current I1 is circulated (that is, only the electric conductors 20 are heated) to limit the amount of heat produced and therefore limit the amount of power used (i.e. the amount of energy dissipated).

According to a different embodiment, the heating device 19 could be adapted only to heat the electrical conductors 20 by Joule effect by circulating the electric current I1 (i.e. the heating device 19 does not comprise the supply device 26 and is not able to heat the outer reinforcing mesh 12 by Joule effect).

The embodiment illustrated by way of example in the accompanying Figures refers to a helicopter 1, but the present invention may also be advantageously used in any type of aircraft or other vehicle, including road or naval vehicles, provided with an engine which must suck in air from the outside in order to operate (for example an off-road or all-terrain vehicle required to operate in extremely cold regions).

The embodiments described herein can be combined without departing from the scope of protection of the present invention.

Numerous advantages are achieved with the helicopter 1 described above.

The helicopter 1 described above presents, from the point of view of the intake of the air necessary for the operation of the turbine engine 2, an FIP ("Full Icing Protection") certification. In particular, heating (to maintain a temperature that is adequately higher than zero Celsius) the electric conductors 20 (in combination or not with the heating of the outer reinforcing mesh 12) avoids the formation (accumulation) of ice on the outer surface of the filter material panel 11.

It is important to underline that the heating action carried out by the electric conductors 20 is extremely effective in that it prevents the ice from developing at the crests 17 of the filtering material panel 11 forming "ice bridges" between the crests 17 which they could completely prevent air from entering and that they would not be easily dissolved by the heat generated by the outer reinforcing mesh 12 since they touch the outer reinforcing mesh 12 only in very small areas at the crests 17 of the filter material panel 11.

In fact, with respect to the formation of the ice on the outer surface of the air filter, the most critical area of the air filter 9 is constituted by the crests 17 of the filter material panel 11; in other words, on the crests 17 of the filtering material panel 11, the accumulation of ice is always greater than the other parts of the filtering material panel 11. In this regard it is important to note that the heating generated by electrification of the outer reinforcing mesh 12 is less effective in the crests 17 of the filter material panel 11 than the other parts of the filter material panel 11 since the crests 17, despite being the more exposed, receive the same amount of heat as the other parts of the filtering material panel 11 (the outer reinforcing mesh 12 is obligatorily distributed in a perfectly homogeneous manner over the entire extension of the filtering material panel 11).

In other words, in the absence of the heating action of the electric conductors 20, it is possible that, in particularly critical outer environmental conditions (i.e. in the presence of undercooled water), "ice bridges" are created between adjacent crests 17 (i.e. pieces of ice which touch the filtering material panel 11 only at the crests 17); such "ice bridges" between adjacent crests 17 are particularly problematic since the ice behaves as a thermal and pneumatic insulator and the heat generated by the electrification of the outer reinforcing mesh 12 may be insufficient to break the "ice bridges". In this regard, it is important to note that it is not possible to excessively increase the electrical power dissipated by the Joule effect (i.e. intended for heat generation) in the outer reinforcing mesh 12, since the vast majority of the outer reinforcing mesh 12 located away from the "ice bridges" could heat up excessively (not having near the ice to be melted) causing the fusion of the outer insulation 27 and therefore the (partial) destruction of the heating device 19.

Instead, the heat generated by the electrical conductors 20 is concentrated in the crests 17 of the filtering material panel 11 and is therefore extremely effective in avoiding the formation of "ice bridges" and in the removal of any "ice bridges" which have formed when the heating device 19 was turned off.

The above described "ice bridges" normally form when the helicopter 1 crosses clouds containing undercooled water which almost instantaneously form ice in contact with a solid. The undercooling is the process of cooling a liquid below its solidification temperature, without the solidification actually taking place; therefore, with undercooled water we mean the phenomenon for which the water remains liquid at temperatures below 0° C. (the undercooled water is an extremely unstable condition and has the property of solidifying almost instantly in contact with other objects).

The combination of the supply device 22 which electrifies the electrical conductors 20 with the supply device 26 which electrifies the outer reinforcing mesh 12 also allows to obtain a high energy efficiency as it allows to choose whether to heat only the electric conductors 20, only the outer reinforcing mesh 12 or both the electric conductors 20 and the outer reinforcing mesh 12, i.e. it allows to choose the most efficient (and therefore also effective) option according to the outer environmental conditions. Moreover, the presence of electric conductors 20 allows to heat the crests 17 of the filtering material panel 11 more (which, as mentioned previously, may be the most critical area for the formation of ice) without, at the same time, having to overheat all the outer reinforcement mesh 12 (i.e. the rest of the filter material panel 11); in this way the heat is concentrated only where it is needed most, without being "wasted" where it is needed less.

Moreover, the electrical conductors 20 arranged at the crests 17 of the filtering panel 11 do not have a significant impact on the air flow treated by the air filter 9, since even in the absence of the electrical conductors 20 the areas of the crests 17 of the filtering material panel 11 contribute only minimally to the passage of air through the filtering material panel 11. In other words, the crests 17 of the filtering panel 11 contribute to a minimum part to the air flow (even in the absence of the electric conductors 20); therefore, the presence of electric conductors 20 does not significantly reduce the flow of air treated by the air filter.

As previously stated, the electric conductors 20 are completely separate and independent from the outer reinforcing mesh 12, so the electric conductors 20 can be made with shapes and materials optimized only for the anti-ice function (on the contrary the main function of the outer reinforcement mesh 12 is to provide mechanical strength to the filtering material panel 11); for example, the electric conductors 20 could reach much higher temperatures than the outer reinforcing mesh 12.

LIST OF REFERENCE NUMBERS OF FIGURES 1 helicopter
2 engine
3 tubular housing
4 air intake
5 air outlet
6 metal grid
7 air box
8 intake system
9 air filter
10 peripheral frame
11 filtering material panel
12 outer reinforcement mesh
13 inner reinforcement mesh
14 warp wires
15 weft wires
16 stiffening mesh
17 crests
18 valleys
19 heating device
20 electrical conductors
21 electric circuit
22 power supply device
23 heads
24 internal core
25 outer insulation
26 power supply device
27 outer insulation
I1 electric current
I2 electric current
V electric voltage

The invention claimed is:

1. A vehicle provided with an engine, at least one air intake through which the engine takes in external air needed to operate, and an air filter arranged downstream of the at least one air intake; the air filter comprises:
    at least one filtering material panel having a corrugated shape having a plurality of crests disposed towards an outer environment and a plurality of valleys interspersed with the plurality of crests and arranged towards an internal environment;
    an outer reinforcement mesh resting against an outer surface of the at least one filtering material panel, through which the air taken in enters so as to flow through said at least one filtering material panel;
    an inner reinforcement mesh resting against an inner surface of the at least one filtering material panel, which is opposite the outer surface; and
    a heating device which is designed to heat the at least one filtering material panel and comprises a first supply device designed to cause a first electric current to flow through at least part of the outer reinforcement mesh so as to generate heat, due to the Joule effect;
    wherein the heating device comprises a plurality of electrical conductors, which are completely independent and separated from the outer reinforcement mesh, rest on the outer surface of the at least one filtering material panel, and are arranged only and exclusively at the plurality of crests; and
    wherein the heating device comprises a second supply device designed to cause a second electric current to flow through the plurality of electrical conductors so as to generate heat, due to the Joule effect.

2. The vehicle according to claim 1, wherein the heating device comprises an electric circuit, which connects all the plurality of electrical conductors and has at least two ends connected to the second supply device.

3. The vehicle according to claim 2, in which the electric circuit connects in parallel all the plurality of electrical conductors of a single crest of the at least one filtering material panel and connects in series the parallel connections of the plurality of crests.

4. The vehicle according to claim 2, wherein
    the plurality of crests of the at least one filtering material panel are divided into groups of crests;
    the electric circuit connects in parallel the plurality of electrical conductors arranged on crests of the same group of crests; and
    the electric circuit connects in series the parallel connections of the plurality of electrical conductors of the groups of crests.

5. The vehicle according to claim 1, wherein each of the plurality of electrical conductors has a circular cross-section.

6. The vehicle according to claim 1, wherein in each of the plurality of crests of the at least one filtering material panel a single electrical conductor is arranged.

7. The vehicle according to claim 1, wherein in each crest of the plurality of crests of the at least one filtering material panel a single electrical conductor is arranged which has a "U" or "V" shaped cross-section and has the concavity arranged towards the crest to embrace the crest.

8. The vehicle according to claim 1, wherein each of the plurality of electrical conductors comprises an inner core made of electrically conductive material and an outer insulation made of an electrically insulating material.

9. The vehicle according to claim 1, wherein the first supply device is independent of the second supply device.

10. The vehicle according to claim 1, wherein the plurality of electrical conductors are fixed to the plurality of crests of the at least one filtering material panel.

11. The vehicle according to claim 1, wherein the plurality of electrical conductors are arranged on the outer reinforcing mesh.

12. Air filter comprising:
at least one filtering material panel having a corrugated shape having a plurality of crests disposed towards an outer environment and a plurality of valleys interspersed with the plurality of crests and arranged towards an internal environment;
an outer reinforcement mesh resting against an outer surface of the at least one filtering material panel, through which the air taken in enters so as to flow through said at least one filtering material panel;
an inner reinforcement mesh resting against an inner surface of the at least one filtering material panel, which is opposite the outer surface; and
a heating device which is designed to heat the at least one filtering material panel and comprises a first supply device designed to cause a first electric current to flow through at least part of the outer reinforcement mesh so as to generate heat, due to the Joule effect;
wherein the heating device comprises a plurality of electrical conductors, which are completely independent and separated from the outer reinforcement mesh, rest on the outer surface of the at least one filtering material panel, and are arranged only and exclusively at the plurality of crests; and
wherein the heating device comprises a second supply device designed to cause a second electric current to flow through the plurality of electrical conductors so as to generate heat, due to the Joule effect.

13. The air filter according to claim 12, wherein the heating device comprises an electric circuit, which connects the plurality of electrical conductors and has at least two ends connected to the second supply device.

14. The air filter according to claim 13, in which the electric circuit connects in parallel all the plurality of electrical conductors of a single crest of the at least one filtering material panel and connects in series the parallel connections of the plurality of crests.

15. The air filter according to claim 13, wherein:
the plurality of crests of the at least one filtering material panel are divided into groups of crests;
the electric circuit connects in parallel the plurality of electrical conductors arranged on the crests of the same group of crests; and
the electric circuit connects in series the parallel connections of the plurality of electrical conductors of the groups of crests.

16. The air filter according to claim 12, wherein each of the plurality of electrical conductors has a circular cross-section.

17. The air filter according to claim 12, wherein in each of the plurality of crest of the at least one filtering material panel a single electrical conductor is arranged.

18. The air filter according to claim 12, wherein in each of the plurality of crest of the at least one filtering material panel a single electrical conductor is arranged which has a "U" or "V" shaped cross-section and has the concavity arranged towards the crest to embrace the crest.

19. The air filter according to claim 12, wherein each of the plurality of electrical conductor comprises an inner core made of electrically conductive material and an outer insulation made of an electrically insulating material.

20. The air filter according to claim 12, wherein the first supply device is independent of the second supply device.

21. The air filter according to claim 12, wherein the plurality of electrical conductors are fixed to the plurality of crests of the at least one filtering material panel.

22. The air filter according to claim 12, wherein the plurality of electrical conductors are arranged on the outer reinforcing mesh.

* * * * *